(12) United States Patent
Tseng

(10) Patent No.: US 7,857,494 B2
(45) Date of Patent: Dec. 28, 2010

(54) ROTATABLE VEHICULAR LAMP ASSEMBLY HAVING A PLATE SPRING

(76) Inventor: Chian-Yin Tseng, No. 60, Lane 105, Wen-Nan Road, Tainan City (TW)

( * ) Notice: Subject to any disclaimer, the term of this patent is extended or adjusted under 35 U.S.C. 154(b) by 150 days.

(21) Appl. No.: 12/390,805

(22) Filed: Feb. 23, 2009

(65) Prior Publication Data
US 2009/0213566 A1 Aug. 27, 2009

(30) Foreign Application Priority Data
Feb. 26, 2008 (TW) .............................. 97106598 A

(51) Int. Cl.
*B60Q 1/06* (2006.01)
(52) U.S. Cl. ...................................... 362/464; 362/523
(58) Field of Classification Search .................. 362/35, 362/464, 467, 523, 526
See application file for complete search history.

(56) References Cited
U.S. PATENT DOCUMENTS
7,703,954 B2 * 4/2010 Kusagaya .................... 362/523
* cited by examiner

*Primary Examiner*—David V Bruce
(74) *Attorney, Agent, or Firm*—Ladas & Parry LLP

(57) ABSTRACT

A rotatable vehicular lamp assembly includes a support frame adapted to be connected to a vehicle and having a horizontal support plate with a through hole, a lighting unit including a lamp body, a pivot rod having a thick part connected to the lamp body and disposed above the support plate, a neck part extending downwardly from the thick part and extending rotatably through the through hole, and a shoulder part disposed between the thick part and the neck part above the support plate, and an annular retaining element sleeved on the neck part below the support plate. A drive unit is disposed below the support plate, and engages the neck part. An annular non-flat plate spring is disposed around the neck part between the shoulder part and the support plate.

5 Claims, 5 Drawing Sheets

US 7,857,494 B2

ROTATABLE VEHICULAR LAMP ASSEMBLY HAVING A PLATE SPRING

CROSS-REFERENCE TO RELATED APPLICATION

This application claims priority of Taiwanese Application No. 097106598, filed on Feb. 26, 2008.

BACKGROUND OF THE INVENTION

1. Field of the Invention

This invention relates to a rotatable vehicular lamp assembly, more particularly to a rotatable vehicular lamp assembly having a plate spring.

2. Description of the Related Art

Referring to FIG. 1, a conventional rotatable vehicular lamp assembly 1 includes a main frame having spaced-apart top and bottom main plates 12, 11, a lamp body 10 having a bottom holder plate 13 connected pivotally to and disposed above a front side of the bottom main plate 11, and a top holder plate 15 connected pivotally to and disposed below a front side of the top main plate 12 and having a driven gear 14, a drive unit 16 mounted between the top and bottom main plates 12, 11, a first vibration-absorbing element 18 disposed between the bottom main plate 11 and the bottom holder plate 13, and a second vibration-absorbing element 19 disposed between the top main plate 12 and the top holder plate 15. Through such a construction, the lamp body 10 can rotate leftward and rightward relative to the main frame. However, because the construction of the aforesaid conventional rotatable vehicular lamp assembly is complicated, assembly and manufacture of the same are troublesome.

SUMMARY OF THE INVENTION

Therefore, the object of the present invention is to provide a rotatable vehicular lamp assembly that has a simple construction so that assembly and manufacture of the same are easy.

According to this invention, a rotatable vehicular lamp assembly comprises a support frame, a lighting unit, and a drive unit. The support frame is adapted to be connected to a vehicle, and includes a horizontal support plate having top and bottom faces, and a through hole extending through the top and bottom faces. The lighting unit includes a lamp body disposed above the support plate, a pivot rod projecting downwardly from the lamp body and having a thick part connected to the lamp body and disposed above the support plate, a neck part extending downwardly from the thick part and extending rotatably through the through hole, and a shoulder part disposed between the thick part and the neck part above the support plate, and an annular retaining element sleeved on the neck part below the support plate. The drive unit is disposed below the support plate, and engages the neck part. An annular non-flat plate spring is disposed around the neck part between the shoulder part and the support plate.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
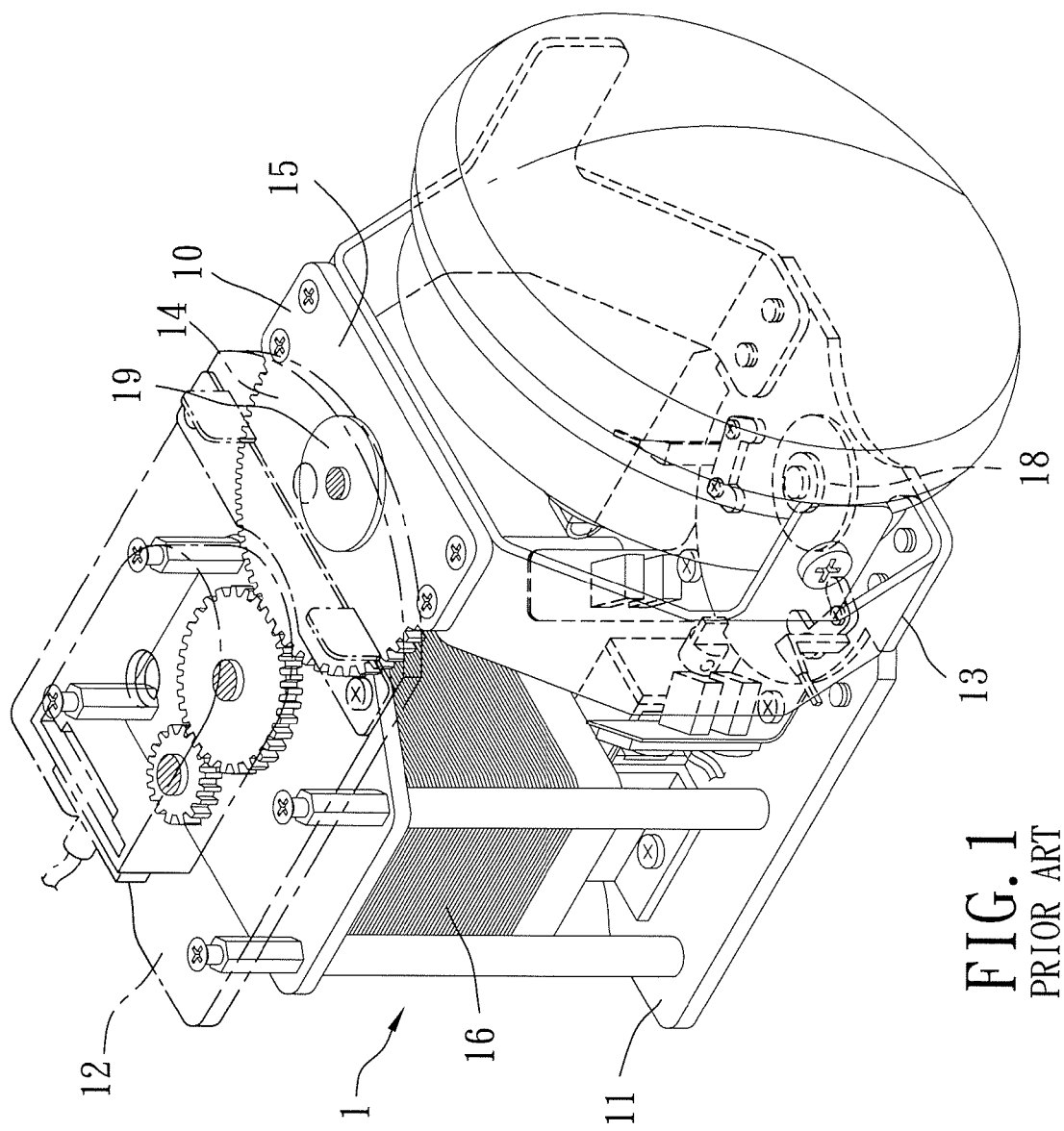
FIG. 1 is a perspective view of a conventional rotatable vehicular lamp assembly.

Referring to FIGS. 2 to 5, a rotatable vehicular lamp assembly according to the preferred embodiment of the present invention is shown to comprise a support frame 3, a lighting unit 4, a drive unit 5, and first and second resilient elements.

The support frame 3 is adapted to be connected fixedly to a vehicle (not shown), and includes a horizontal support plate 31 having top and bottom faces 311, 312, and a plurality of mounting portions 32 projecting outwardly and respectively from rear sides of the top and bottom faces 311, 312 for connection with the vehicle. The support plate 31 is formed with a through hole 310 extending through the top and bottom faces 311, 312 in proximity to a front end thereof.

The lighting unit 4 includes a lamp body 41 disposed above the top face 311 of the support plate 31, and a pivot rod 42 projecting downwardly from the lamp body 41 and having a thick part 421 connected to the lamp body 41 and disposed above the support plate 31, a neck part 422 extending downwardly from the thick part 421 and extending rotatably through the through hole 310, and a shoulder part 423 disposed between the thick part 421 and the neck part 422 above the support plate 31. An annular retaining element 43 is sleeved on and fixed to the neck part 422 below the support plate 31 so as to retain the pivot rod 42 on the support plate 31. The neck part 422 has a bottom end provided with an annular groove wall defining a shaft-engaging groove 420 and having a plurality of spaced-apart radial protrusions 4221.

The drive unit 5 includes a housing 52 disposed on the bottom face 312 of the support plate 31, and a shaft 51 projecting outwardly from a top face of the housing 52 and having a plurality of spaced-apart indentations 511 that engage respectively the radial protrusions 4221 of the neck part 422. The shaft 51 is connected to and is driven to rotate by a drive element (not shown) of the drive unit 5 in a conventional manner. Since the construction of the drive unit 5 is known in the art, a detailed description of the same is dispensed herewith.

Each of the first and second resilient elements is configured as an annular non-flat plate spring 6, 6' (referred to hereinafter respectively as the first plate spring 6 and the second plate spring 6'). The first plate spring 6 is disposed around the neck part 422 between the shoulder part 423 and the top face 311 of the support plate 31, thereby providing a rotational resistance between the thick part 421 of the pivot rod 42 and the top face 311 of the support plate 31. The second plate spring 6' is disposed around the neck part 422 between the bottom face 312 of the support plate 31 and the retaining element 43, thereby providing a rotational resistance between the retaining element 43 and the bottom face 312 of the support plate 31. The configuration of each of the first and second resilient elements is not limited to the present disclosure.

Figure 2:
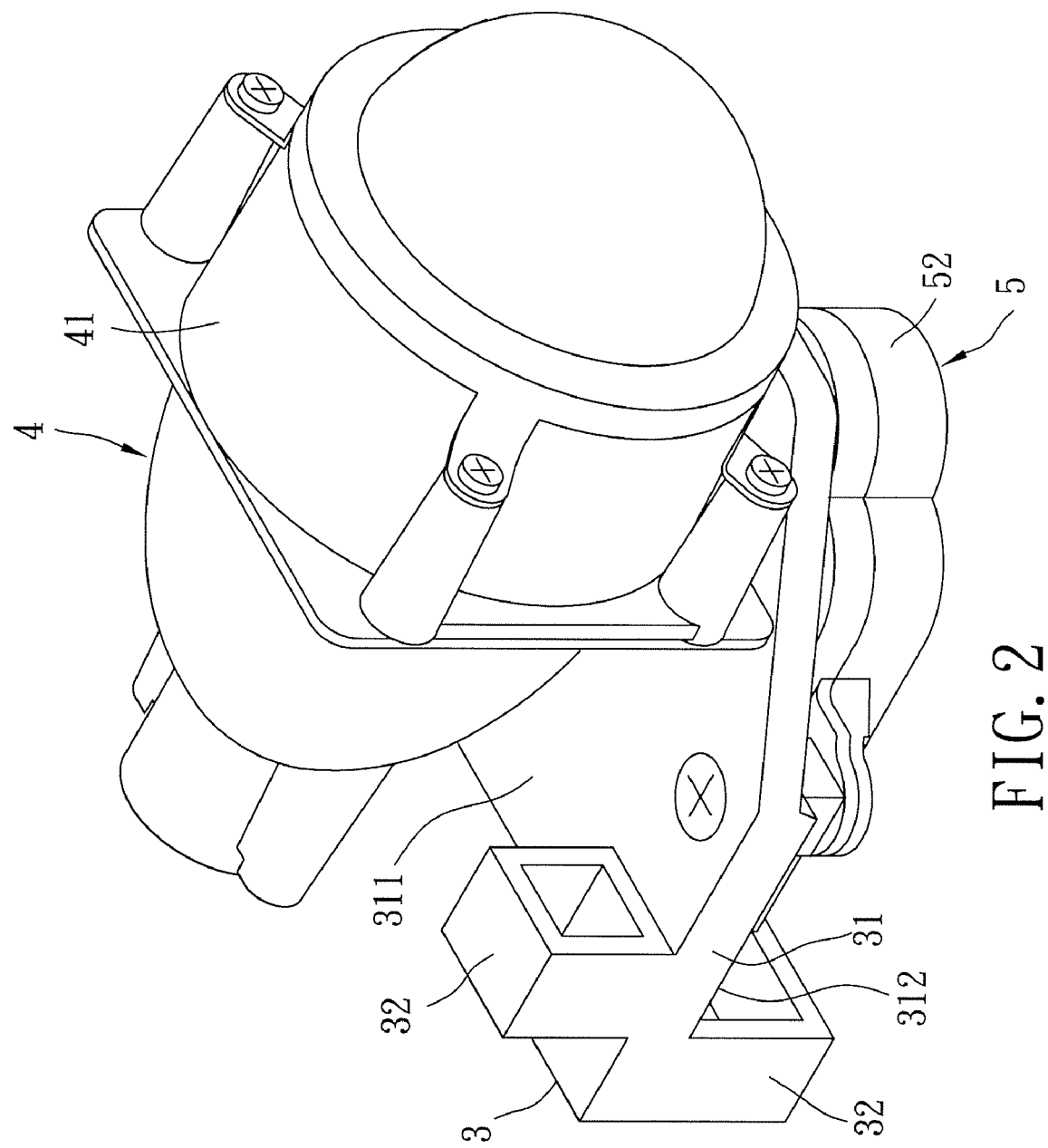
FIG. 2 is a perspective view of a rotatable vehicular lamp assembly according to the preferred embodiment of the present invention.
Figure 3:
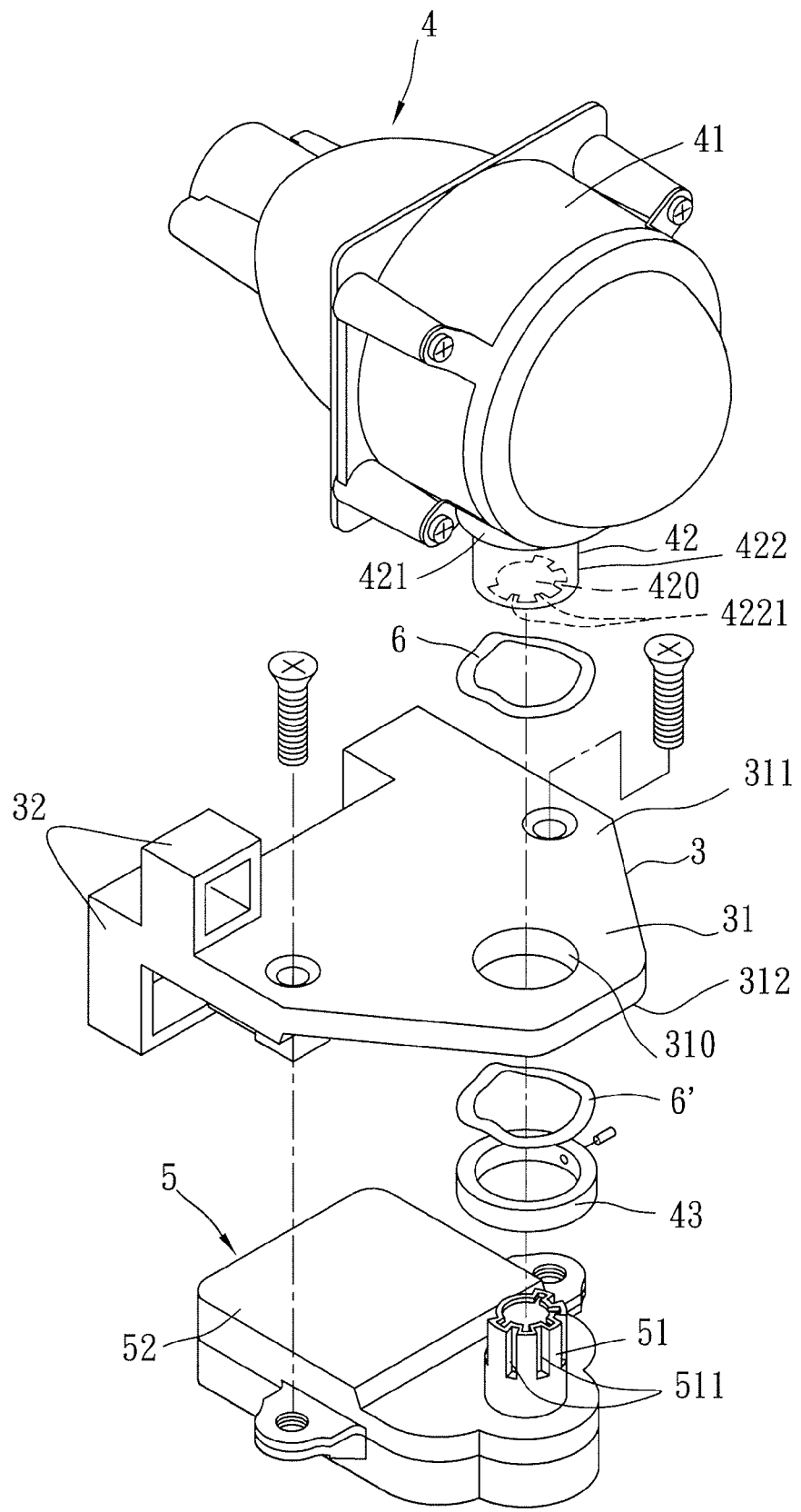
FIG. 3 is an exploded perspective view of the preferred embodiment.
Figure 4:
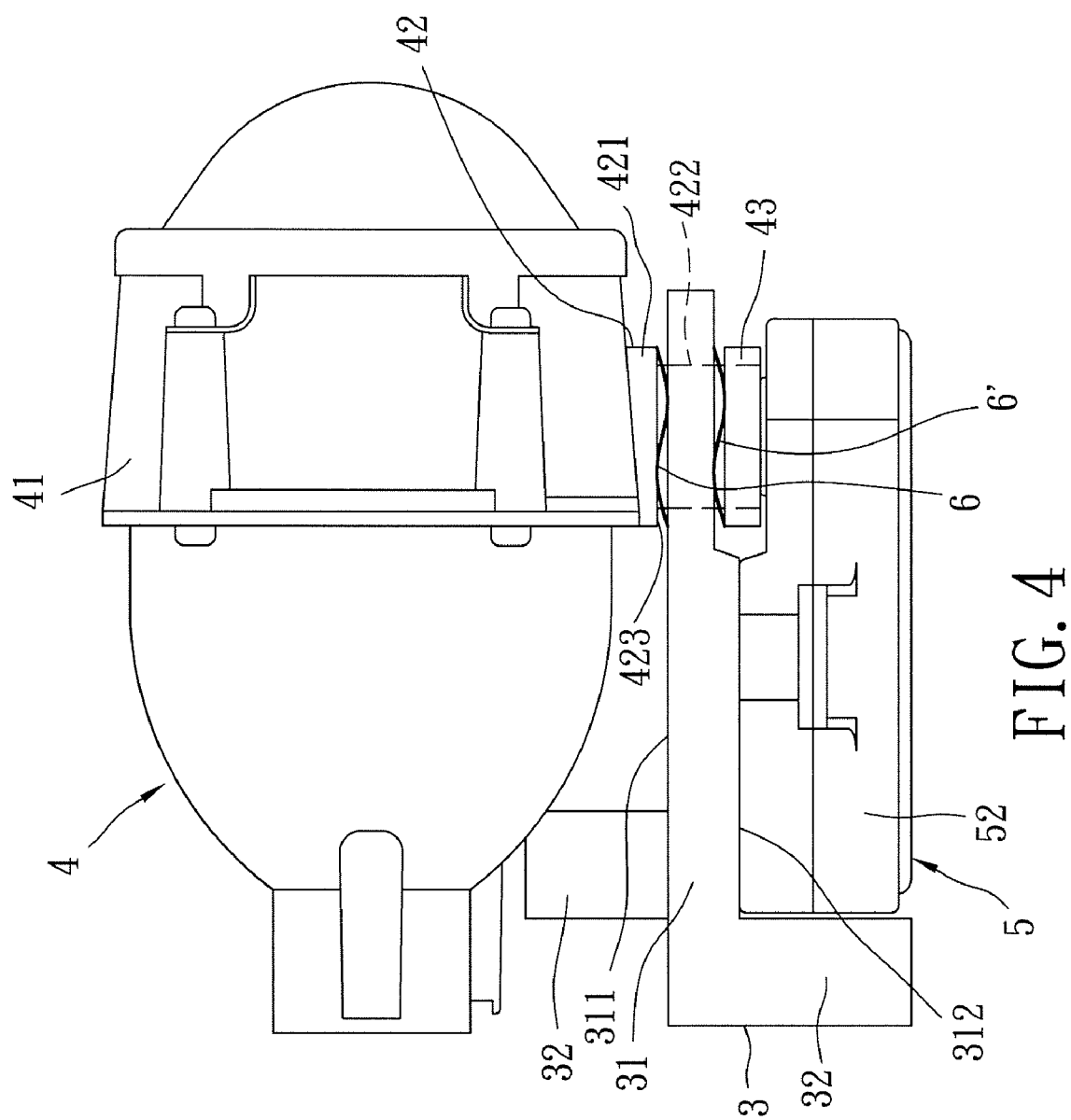
FIG. 4 is a schematic side view of the preferred embodiment in an assembled state.
Figure 5:
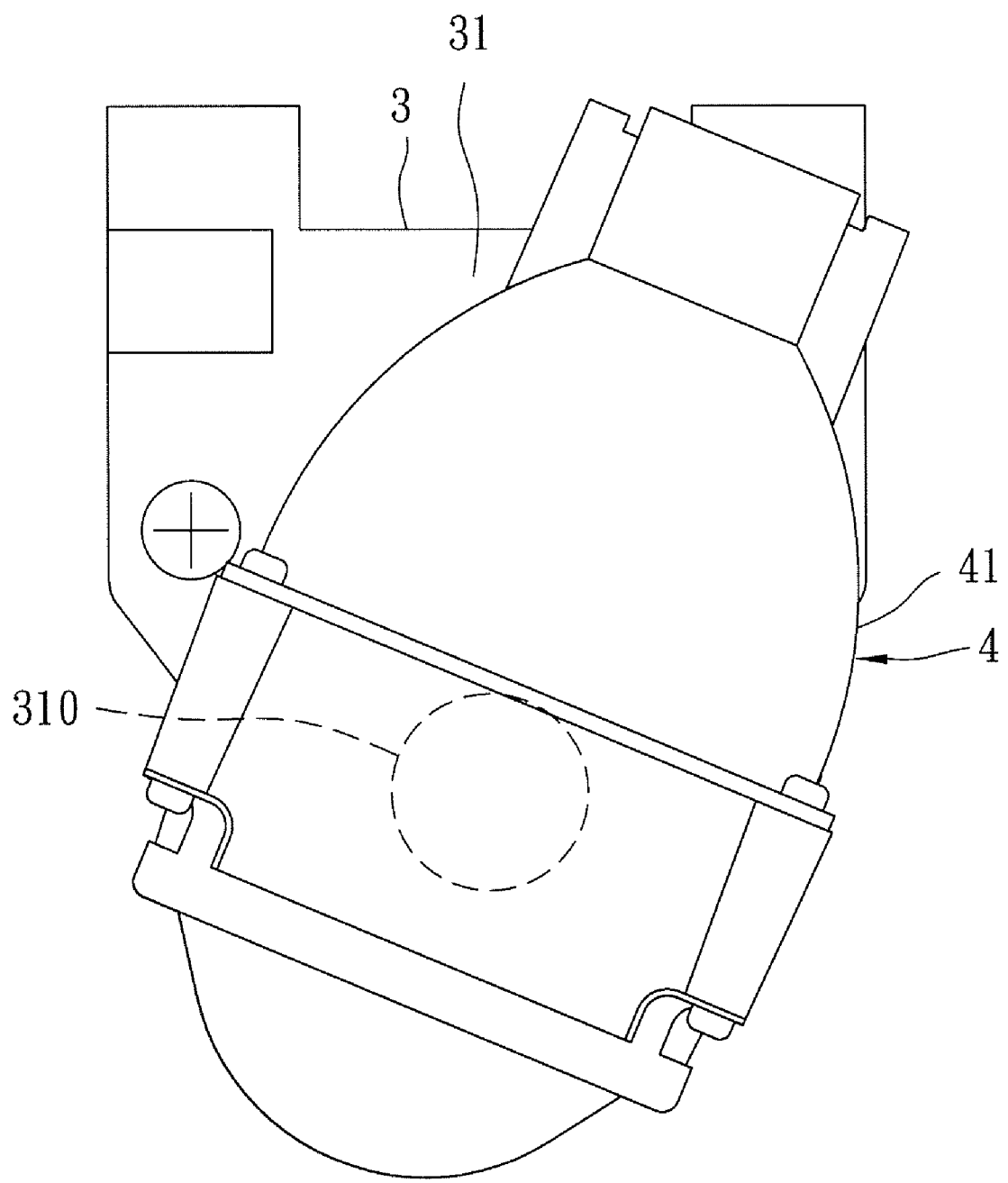
FIG. 5 is a schematic top view of the preferred embodiment.

Referring to FIGS. 2, 4, and 5, when the drive element of the drive unit 5 activates the shaft 51 to rotate, the pivot rod 42 is driven by the shaft 51 to rotate therealong, thereby bringing the lamp body 41 to pivot leftward and rightward relative to the support plate 31. As the drive element discontinues activating the shaft 51, rotation of the lamp body 41 also stops immediately due to the resistance provided by the first and second plate springs 6, 6'. Further, the first and second plate springs 6, 6' can absorb the axial vibrations produced during movement of the vehicle, so that the lighting unit 4 rotates stably relative to the support plate 31 of the support frame 3.

In actual practice, only one of the first and second plate springs 6, 6' may be provided on the rotatable vehicular lamp assembly. The effect of immediately stopping rotation of the lighting unit 4 relative to the support frame 3 and absorption of vibration can be similarly achieved.

From the aforementioned description, it is apparent that through the structural connection of the lighting unit 4 and the support frame 3, and through the presence of the first and second spring plates 6, 6' between the lighting unit 4 and the support frame 3, the components of the vehicular lamp assembly of the present invention are largely reduced, so that assembly and manufacture of the vehicular lamp assembly of the present invention are easy, and moreover, the cost of manufacturing the same can be minimized.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A rotatable vehicular lamp assembly, comprising:
   a support frame adapted to be connected to a vehicle and including a horizontal support plate having top and bottom faces, and a through hole extending through said top and bottom faces;
   a lighting unit including a lamp body disposed above said support plate, a pivot rod projecting downwardly from said lamp body and having a thick part connected to said lamp body and disposed above said support plate, a neck part extending downwardly from said thick part and extending rotatably through said through hole, and a shoulder part disposed between said thick part and said neck part above said support plate, and an annular retaining element sleeved on said neck part below said support plate;
   a drive unit disposed below said support plate and engaging said neck part; and
   an annular non-flat first plate spring disposed around said neck part between said shoulder part and said support plate.

2. The rotatable vehicular lamp assembly of claim 1, further comprising an annular non-flat second plate spring disposed around said neck part between said support plate and said retaining element.

3. The rotatable vehicular lamp assembly of claim 1, wherein said drive unit includes a housing, and a shaft projecting outwardly from said housing to engage said pivot rod.

4. The rotatable vehicular lamp assembly of claim 3, wherein said neck part has a bottom end provided with an annular groove wall defining a shaft-engaging groove and having a plurality of spaced-apart radial protrusions, said shaft having a plurality of spaced-apart indentations for engaging respectively said radial protrusions.

5. The rotatable vehicular lamp assembly of claim 1, wherein said support frame further includes a plurality of mounting portions projecting outwardly from said support plate and adapted to be connected to the vehicle.

\* \* \* \* \*